United States Patent [19]

Visvesvaraya

[11] Patent Number: 4,794,870
[45] Date of Patent: Jan. 3, 1989

[54] MODULATING METHOD AND SYSTEM FOR KILN FIRING

[76] Inventor: Hosagrahar C. Visvesvaraya, M-10 NDSE II, Ring Road, New Delhi 110 049, India

[21] Appl. No.: 122,225

[22] Filed: Nov. 18, 1987

[51] Int. Cl.$^4$ ............................................. F23H 5/00
[52] U.S. Cl. ................. 110/187; 110/101 C; 110/186; 110/347
[58] Field of Search ............... 110/185, 186, 187, 347, 110/101 C, 101 CF

[56] References Cited

U.S. PATENT DOCUMENTS

| | | | |
|---|---|---|---|
| 4,140,067 | 2/1979 | Jensen | 110/187 X |
| 4,630,552 | 12/1986 | Lovgren | 110/186 X |
| 4,739,714 | 4/1988 | LaSpisa et al. | 110/187 |

Primary Examiner—Edward G. Favors
Attorney, Agent, or Firm—Kerkam, Stowell, Kondracki & Clarke

[57] ABSTRACT

The invention relates to a method and system for modulating the firing temperature in a rotary kiln. The method comprises determining the absolute content of one or more inorganic constituents present in the coal feed for determining the total ash content in the coal. In the event that the temperature in the kiln is different from the required temperature, then a sweetner fuel is fed to the burner with or without a change in the flow of coal. Alternatively, only the amount of flow of coal to the burner is reduced or increased.

11 Claims, 3 Drawing Sheets

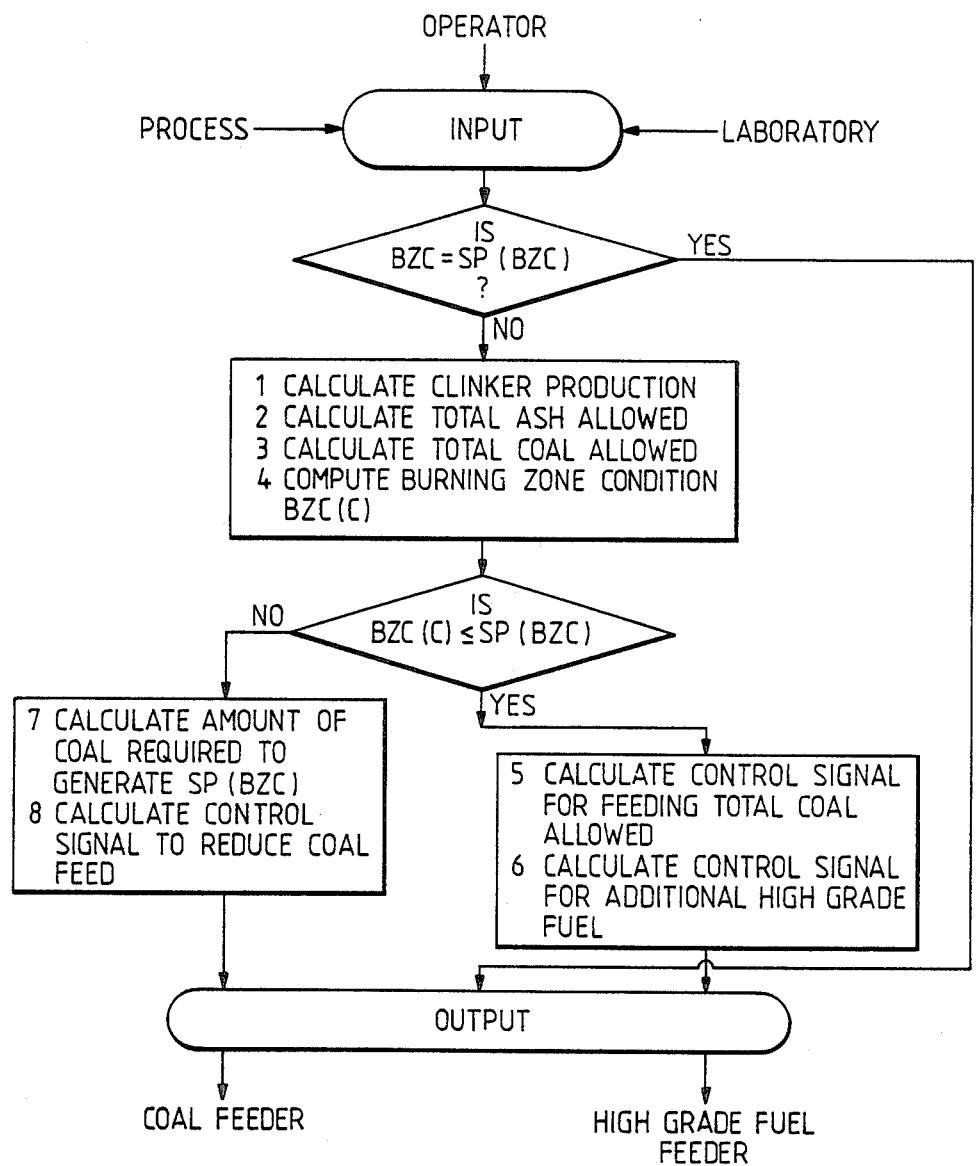

MODULATING METHOD AND SYSTEM FOR KILN FIRING

FIELD OF INVENTION

This invention relates to a method of modulating the firing of a kiln having pulverized coal burners and a system for carrying out the method. The invention is particularly intended for rotary kilns for the production of cement clinkers but is not limited thereto. The kilns are fed with a mix, which in the case of cement clinker producing kilns, comprises limestone, clay, and certain selected additives depending on the compositiion and desired properties of the cement produced. A stream of pulverized coal and air is supplied to the kiln through a burner and burnt therein to process the mix and convert the same into clinker.

PRIOR ART

In the manufacture of cement clinker, one of the desired process parameters consist in providing the burning zone of the rotary kiln with the desired temperature and then maintaining such a temperature. Such burning conditions are necessary so as to produce a clinker with the desired uniform quality. It is known that a variable quality of coal or use of high ash containing coals can affect the burning conditions of a rotary kiln and, thereby, affect the quality and uniformity of clinker and adversely affect the life of the refractory lining etc.

The use of high ash containing coal is attended with several distinct disadvantages. One such disadvantage is that a high ash content coal, when employed as a fuel in a rotary kiln, lowers the $C_3S$ content in the clinker. This increases the grinding energy of the clinker and reduces the strength of the cement so obtained. Further, it also reduces the output as a high ash content coal produces less heat in the burning zone of the rotary kiln. It is known that coal in a pulverized state is fed as a fuel to a rotary kiln. A high ash content coal is difficult to grind, but this is necessary as only coal in a pulverized state is to be fed to the kiln. Furthermore, the use of high ash content coal requires a better quality of limestine in the mix. Yet another disadvantage is that a high ash content coal results in ring formatiion within the kiln. Such ring formations reduce the total effective diameter of the kiln. Furthermore, a high ash content coal takes a longer time to burn and provides less heat.

Various processes are known for the beneficiation of coal in order to remove ash forming mineral matters in coal. One such process consists in grinding coal to a fine size and then adding certain chemicals thereto. It is then subjected to the step of froth flotation. A disadvantages associated with such a process is one of higher costs and, further, the rejects are to be thrown away as a pollutant. Yet another disadvantage is that the coal is moist and must be subjected to the step of drying before it is fed to the kiln.

Several disadvantages are also associated with coal having a variable composition. One such disadvantage is that the calorific value would vary and, thereby, result in temperature fluctuations. Further, the temperature profile throughout the kiln changes whereby a clinker with the desired phase composition is not obtained. Further, as a varying temperature provides a non-uniform burning of the clinker, a yellow or unburnt clinker is generally obtained. Another disadvantage is that a fluctuating temperature provides an unstable coating at the burning zone and reduces the life of the refractory lining of the kiln.

SUMMARY OF THE INVENTION

An object of this invention is to provide a modulating method of kiln firing and a system therefor which ensures a uniform temperature in the burning zone of a rotary kiln.

Another object of this invention is to provide a modulating method of kiln firing and a system therefor which assists in achieving prolonged life of the refractory lining of the kiln.

Still another object of this invention is to provide a modulating method of kiln firing and a system therefor which provides an improved and uniform quality of clinker.

Yet another object of this invention is to provide a modulating method of kiln firing and a system therefor which obviates the disadvantages associated with those of the prior art.

The method of the invention comprises steps of periodically drawing samples of coal from the feed line for feeding pulverized coal to a burner, preparing a feed sample for an on-line analyses, determining the absolute content of one or more inorganic constituents present in the coal feed sample by using an analyzer, feeding such data to a process computer along with information regarding the temperature in the kiln, determining the total ash content in the coal from said data and in the event that the temperature in the kiln is below or above its predetermined value, the process computer provides signals for allowing, if required, addition of a sweetener fuel with or without change in the flow of coal, or otherwise signals only for reducing or increasing the flow of coal to said burner.

The system for allowing a modulating method of kiln firing of the present invention, for enabling uniformity in the burning zone conditions in the kiln, comprises a feed line for supplying pulverized coal to a multi channel burner, an automatic sampler connected to said feed line for periodically drawing samples of coal, a sample preparation unit connected to said sampler for preparing a coal feed, an on-line analyzer connected to said preparation unit for determining the absolute content of one or more inorganic constituents present in said coal feed, a computer for receiving the data from said analyser in conjunction with other data from the kiln, the ash content present in the sample being determined from the absolute content of said one or more inorganic constituents, said computer providing signals, if required, to means for adding of a sweetener fuel with or without change in the flow of coal or means only for reducing or increasing the flow or coal to said burner.

The method and the modulation system of the present invention enables one to achieve uniformity in burning zone conditions in the kiln, and provides a uniform quality of clinker. Furthermore, it increases the life of the refractory lining of the kiln.

In accordance with the present invention, it has now been found that the absolute content of one or more inorganic constituents present in the sample and as determined from the analyzer provides practically instantaneous data on the ash content present in the coal sample. The time required for ash determination by a conventional method is about 2-3 hours.

BRIEF DESCRIPTION OF THE DRAWINGS

FIG. 7 shows the logic diagram for a software.

DESCRIPTION OF A PREFERRED EMBODIMENT

Figure 1:
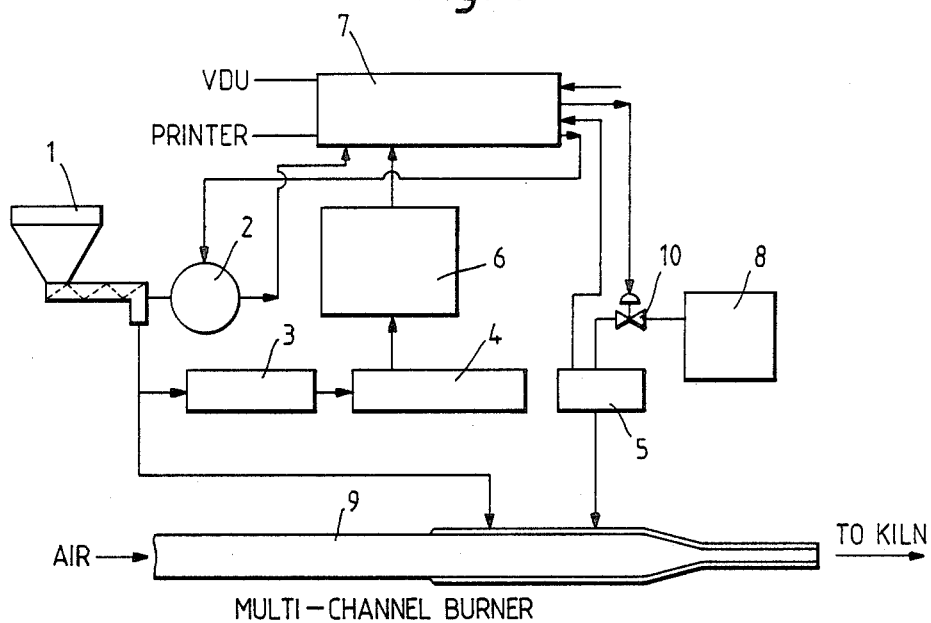
FIG. 1 is a schematic diagram of the coal quality modulation system.
Figure 2:
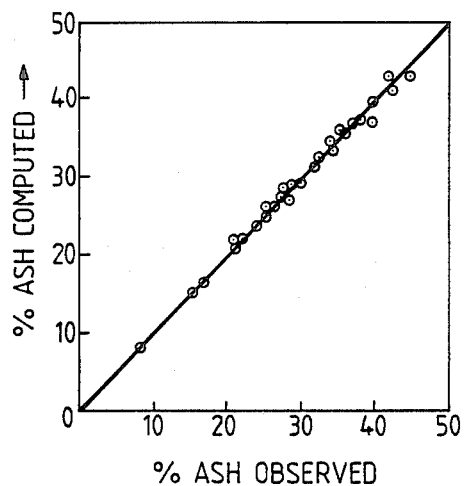
FIGS. 2 to 6 show the calculated ash based on silica, iron, alumina, calcium and magnesium correlation respectively vs. reported ash.
Figure 3:
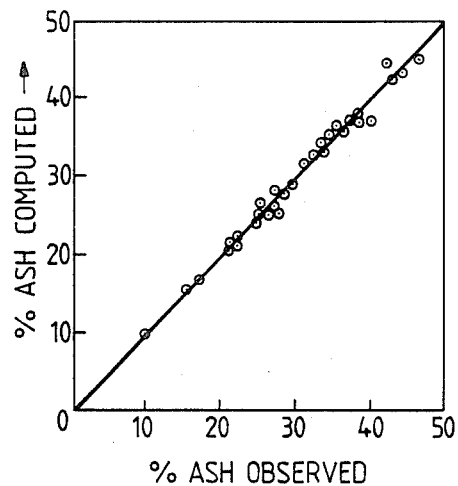
Figure 4:
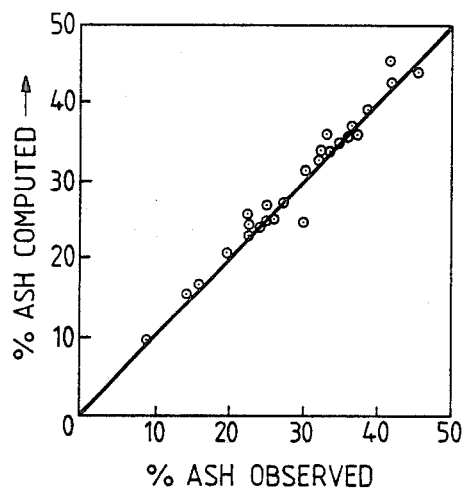
Figure 5:
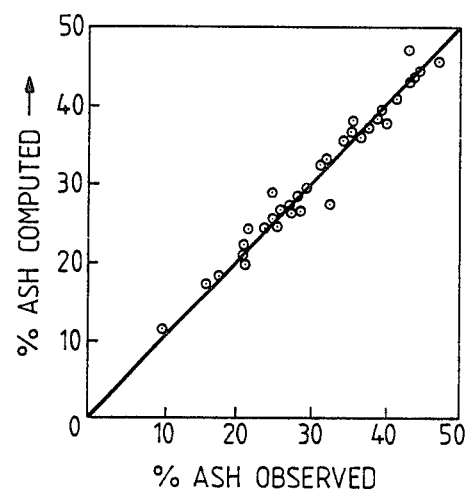
Figure 6:
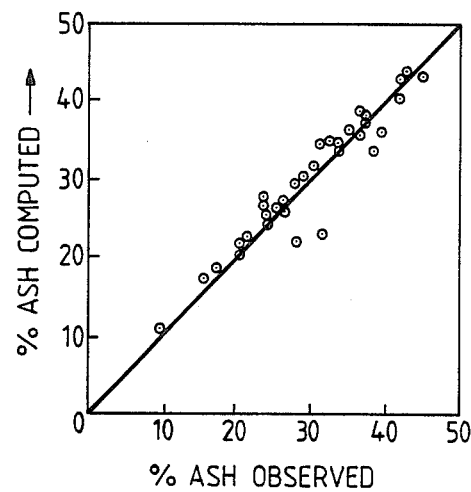

In FIG. 1, the pulverized coal feeder (1) which supplies weighed quantities of pulverized coal to a multichannel burner (9) is driven by a variable speed drive (2). An automatic sampler (3) removes samples continuously which are collected in a small hopper, mixed and then part or the whole of a sample is taken to the sample preparation unit (4). In the unit (4) the pulverized coal is mixed with a binder and compressed into briquettes in a known manner. The said briquettes are fed to an on-line analyser unit (6) wherein the percentages of silica, alumina, iron, magnesium and calcium oxide are determined. The information regarding the percentages of the contents of silica, alumina and others of said substances is fed to a process computer (7). Information regarding the instantaneous value of the temperature in the kiln (not shown) is also supplied to the computer (7). If the temperature in the kiln is too high, it is evident that coal having a higher calorific value is being supplied and the computer (7) will cause the variable speed drive (2) to be controlled so as to reduce the coal supplied to the burner. On the other hand a reduced temperature would indicate a lower calorific value of coal due to the higher ash content of coal. In such an event computer (7) will actuate a means (10) for supplying a sweetener fuel, such as fuel oil or fuel gas, from storage (8) to the multi-channel burner (9) through a flow meter (5). Simultaneously, or alternatively, computer (7) may actuate variable speed drive (2) to change the supply of coal to burner (9).

The analyser (6) is a suitable analytical equipment for quick and accurate measurement of inorganic constituents in coal. The controlling microprocessor or dedicated computer of this equipment or the main process control computer is used to convert the data from the analyzer to ash content of the coal in accordance with a established statistical relationship of the type reported above. In another modification, analyzer unit 6 can be a direct on-line ash determinator also.

The process computer has interfaces with a laboratory, process and operations controls, and executes the control in accordance with software, a logic diagram of which is shown in FIG. 7.

Reference is now made to Table 1 which shows the calculations carried out on 35 different samples of coal. The calculations relate to the percentage amount of $SiO_2$, $Fe_2O_3$, $Al_2O_3$, $CaO$ and $M_gO$ present in such of the samples. Based upon such calculations and multiple regression analysis, the following multiple regression equations have been evolved for carrying out the said analysis and the results for Examples 1 to 5 are shown in FIGS. 2-6.

Example 1

Ash $\% = 1.03 + 1.075(SiO_2) + 1.442(Fe_2O_3) + 1.035(Al_2O_3) + 1.034(CaO) + 1.36(MgO)$: Multiple correlation coefficient = 0.9923

Example 2

Ash $\% = 0.2589 + 1.153(SiO_2) + 1.388(Fe_2O_3) + 0.849(Al_2O_3) + 2.166(MgO)$: Multiple correlation coefficient = 0.9848

Example 3

Ash $\% = 1.464 + 1.195(SiO_2) + 2.074(Fe_2O_3) + 0.482(Al_2O_3)$: Multiple coefficient = 0.9646

Example 4

Ash $\% = 2.289 + 1.315(SiO_2) + 2.403(Fe_2O_3)$: Multiple correlation coefficient = 0.9612

Example 5

Ash $\% = 5.608 + 1.439(SiO_2)$: Multiple correlation coefficient = 0.9021.

Based on the values of the multiple correlation coefficients it is seen from the above set of equations that, depending on the complexity of the coal, a statistically valid and practically acceptable simple or complex relationship can always be evolved for the indirect estimation of ash content.

TABLE 1

CCAL ANALYSIS DATA

| Sl No | Percent Ash in Coal | Percent Inorganic Constituents in Coal | | | | |
|---|---|---|---|---|---|---|
| | | $SiO_2$ | $Fe_2O_3$ | $Al_2O_3$ | CaO | MgO |
| 1 | 2 | 3 | 4 | 5 | 6 | 7 |
| 1 | 24.36 | 13.6 | 1.77 | 8.06 | 0.48 | 0.13 |
| 2 | 26.04 | 13.8 | 2.30 | 8.68 | 0.74 | 0.11 |
| 3 | 15.97 | 8.48 | 1.55 | 4.73 | 0.38 | 0.13 |
| 4 | 20.80 | 11.19 | 1.62 | 6.34 | 0.56 | 0.16 |
| 5 | 17.68 | 9.20 | 1.52 | 5.38 | 0.66 | 0.13 |
| 6 | 34.96 | 20.83 | 2.05 | 7.27 | 2.53 | 0.25 |
| 7 | 24.24 | 14.37 | 2.62 | 4.82 | 0.64 | 0.24 |
| 8 | 40.65 | 24.67 | 2.42 | 9.16 | 0.86 | 0.23 |
| 9 | 36.76 | 19.72 | 3.28 | 10.03 | 1.18 | 0.32 |
| 10 | 31.83 | 19.17 | 2.10 | 7.69 | 0.50 | 0.45 |
| 11 | 27.03 | 10.63 | 3.60 | 7.95 | 1.62 | 0.09 |
| 12 | 40.30 | 22.79 | 3.40 | 10.62 | 0.38 | 0.21 |
| 13 | 40.27 | 22.67 | 5.08 | 9.84 | 0.40 | — |
| 14 | 9.92 | 4.14 | 1.35 | 1.84 | 0.94 | 0.07 |
| 15 | 34.64 | 21.08 | 1.77 | 8.27 | 1.48 | 0.18 |
| 16 | 31.37 | 18.97 | 1.92 | 7.55 | 0.59 | 0.49 |
| 17 | 41.05 | 25.43 | 2.26 | 8.14 | 2.81 | 4.49 |
| 18 | 33.70 | 20.09 | 1.89 | 8.57 | 1.21 | 0.28 |
| 19 | 29.72 | 19.22 | 1.28 | 7.28 | 0.92 | 0.08 |
| 20 | 36.26 | 18.09 | 3.02 | 9.20 | 1.08 | 0.29 |
| 21 | 29.17 | 17.05 | 2.28 | 7.74 | 0.73 | 0.17 |
| 22 | 32.90 | 20.05 | 1.42 | 8.57 | 1.04 | 0.36 |
| 23 | 30.95 | 11.47 | 3.68 | 5.99 | 3.72 | 3.41 |
| 24 | 43.96 | 25.36 | 2.69 | 9.54 | 2.75 | 0.52 |
| 25 | 24.60 | 13.02 | 2.18 | 6.79 | 0.99 | 0.69 |
| 26 | 34.98 | 20.35 | 2.19 | 9.06 | 1.07 | 0.32 |
| 27 | 27.90 | 16.16 | 1.65 | 6.51 | 1.60 | 0.31 |
| 28 | 26.31 | 14.42 | 1.75 | 6.01 | 1.98 | 0.30 |
| 29 | 23.74 | 14.10 | 1.32 | 5.78 | 1.27 | 0.22 |
| 30 | 32.23 | 18.37 | 3.14 | 8.76 | 0.63 | 0.27 |
| 31 | 25.43 | 14.39 | 1.62 | 5.73 | 2.53 | 0.23 |
| 32 | 26.92 | 15.85 | 1.52 | 6.09 | 2.35 | 0.30 |
| 33 | 21.24 | 11.37 | 1.82 | 5.84 | 1.79 | — |
| 34 | 21.04 | 10.86 | 1.62 | 6.40 | 1.77 | — |
| 35 | 21.64 | 11.85 | 2.31 | 5.73 | 1.51 | — |

We claim:

1. A method of modulating the firing of a kiln having a pulverized coal burner comprising the steps of periodically drawing samples of coal from a feed line supplying pulverized coal to the burner; preparing a coal feed sample from said samples for an on-line analyzer; determining the absolute content of one or more inorganic constituents of ash present in the coal feed sample using said analyzer; supplying data corresponding to said content to a process computer along with information related to the temperature in the kiln; determining the total ash content in the coal from the data; and maintaining the temperature in the kiln uniform by controlling, in response to either a variation in the total ash content of the coal supplied to the burner or a variation in the temperature in the kiln, the addition of a sweetener fuel and the flow of coal to the burner.

2. A method as claimed in claim 1, wherein said controlling comprises providing first signals from the process computer for causing the addition of the sweetener fuel, and providing second signals from the process computer for controlling the flow of coal.

3. A method as claimed in claim 1, wherein said controlling comprises simultaneously controlling both the addition of the sweetener fuel and the flow rate of coal.

4. A method as claimed in claim 1, wherein said controlling comprises causing the addition of the sweetener fuel upon the temperature in the kiln being lower than a predetermined temperature or upon the total ash content in the coal being greater than the predetermined content.

5. A method as claimed in claim 1, wherein said controlling comprises reducing the flow of coal to the burner upon the temperature in the kiln being greater than a predetermined temperature or upon the ash content of the coal being less than a predetermined content.

6. A method as claimed in claim 1, wherein said step of determining the total ash content comprises calculating the absolute content of silica, iron, alumina, calcium and magnesium present in the coal.

7. A method as claimed in claim 1, wherein said step of determining the total ash content comprises calculating the absolute content of alumina, iron, silica and magnesium.

8. A method as claimed in claim 1, wherein said step of determining the total ash content comprises calculating the absolute content of silica, alumina and iron.

9. A method as claimed in claim 1, wherein said step of determining the total ash content comprises calculating the absolute content of either silica and iron or only silica.

10. A coal quality modulation system for enabling uniformity in the burning zone conditions in a kiln having a feed line for supplying pulverized coal to a multichannel burner of the kiln, the system comprising an automatic sampler connected to said feed line for periodically drawing samples of coal from the feel line, a sample preparation unit connected to said sampler for preparing a coal feed sample, an on-line analyzer connected to said preparation unit for determining the absolute content of at least one inorganic constituent in the coal feed sample, a computer for receiving data corresponding to said content from said analyzer and for receiving other data corresponding to the temperature in the kiln, the ash content present in the sample being determined from the absolute content of said inorganic constituent, and means responsive to a signal from said computer for controlling the addition of a sweetener fuel and the flow of coal to said burner so as to maintain the temperature in the kiln uniform.

11. A coal quality modulation system as claimed in claim 10 comprising means for supplying a predetermined weighed amount of pulverized coal to the feed line, a conveyor for conveying coal from the supplying means to the feed line, and a variable speed drive adapted to receive a signal from said process computer for driving said conveyor.

* * * * *